(12) United States Patent
Davis et al.

(10) Patent No.: US 6,251,294 B1
(45) Date of Patent: Jun. 26, 2001

(54) ULTRASONIC FILTER REGENERATING APPARATUS AND METHOD

(75) Inventors: Scott Judson Davis; Dan Michael Hausermann, both of Kalamazoo, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 08/995,736

(22) Filed: Dec. 22, 1997

(51) Int. Cl.$^7$ .................................................. B01D 29/72
(52) U.S. Cl. .................. 210/785; 210/791; 210/106; 210/269; 210/321.69; 210/332; 210/334; 210/384; 210/388; 210/389; 210/391; 210/392; 210/407; 310/325; 55/430; 55/432
(58) Field of Search ..................................... 210/791, 785, 210/106, 269, 280, 319, 321.69, 332, 334, 383, 384, 388, 389, 391, 392, 407; 310/325; 55/430, 432

(56) References Cited

U.S. PATENT DOCUMENTS

| | | |
|---|---|---|
| 3,692,178 | 9/1972 | Reece . |
| 3,870,640 | 3/1975 | Reece . |
| 4,193,009 * | 3/1980 | Durley, III . |
| 4,253,962 * | 3/1981 | Thompson . |
| 4,409,005 * | 10/1983 | McKendrick . |
| 4,802,487 * | 2/1989 | Martin et al. . |
| 4,836,922 | 6/1989 | Rishel et al. . |
| 5,059,331 | 10/1991 | Goyal . |
| 5,062,965 * | 11/1991 | Bernou et al. ................. 210/748 |
| 5,084,176 | 1/1992 | Davis et al. . |
| 5,088,510 * | 2/1992 | Bannon . |
| 5,298,161 * | 3/1994 | Sieg . |
| 5,343,443 * | 8/1994 | Merewether . |

* cited by examiner

Primary Examiner—W. L. Walker
Assistant Examiner—Michael A. Fleming
(74) Attorney, Agent, or Firm—Flynn, Thiel, Boutell & Tanis, P.C.

(57) ABSTRACT

A self-regenerating filter unit having a housing which carries an ultrasonic transducer periodically energizable to dislodge caked solids from a filter element in the housing. The removed solids collect in a storage zone where they are periodically removed.

15 Claims, 6 Drawing Sheets

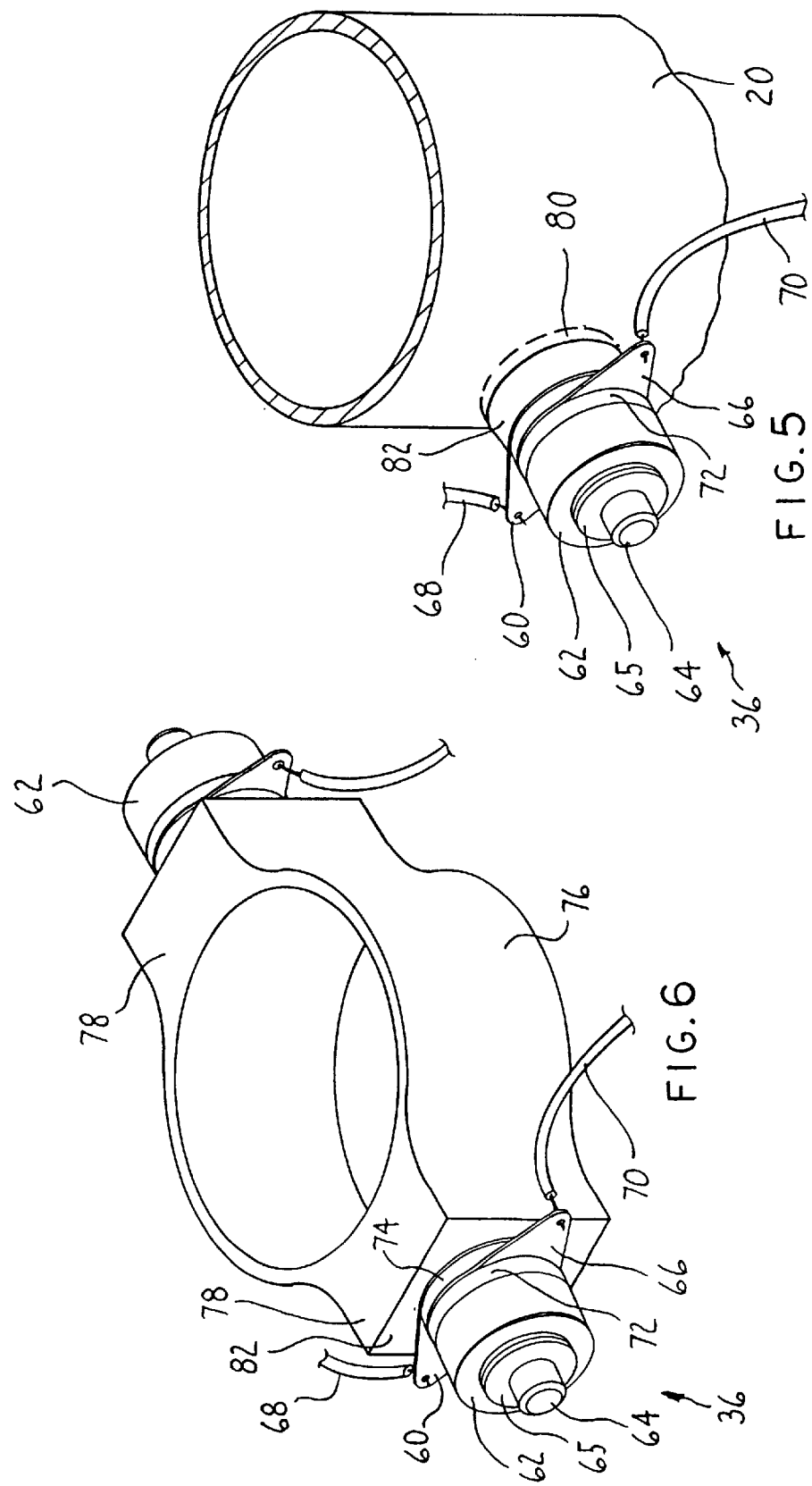

ULTRASONIC FILTER REGENERATING APPARATUS AND METHOD

FIELD OF THE INVENTION

This invention relates generally to industrial process filter systems, and more specifically to apparatus and methods for regenerating filtered-out solids from a filter element.

BACKGROUND OF THE INVENTION

Filter systems comprising one or more filter units, are conventionally used in many industrial facilities to remove contaminant solids from process liquid streams. A conventional filter unit comprises a filter housing enclosing one or more filter elements. A filter element typically strains or screens solids from the liquid stream. The filter element typically has a selected pore size and is intended to remove solids of larger than pore size from the liquid stream. The filtered-out solids tend to gradually accumulate, or cake, on the input surface of the filter element. Thus, the liquid flow rate through the filter tends to decrease, and the liquid pressure across the filter element tends to increase, with the growth of the cake and hence with the length of time of filter use.

The accumulated solids cake on the filter element eventually grows enough to block or occlude the filter element enough to impair filtering efficiency. Thus, eventually action is required to unblock the filter element to restore filtering efficiency.

Various prior art techniques have been used to unblock the filter element.

One prior technique is to simply replace the blocked filter element with a new filter element. However, this is expensive in terms of downtime, while the filter assembly is off-line during element replacement, and in terms of new filter element cost.

In another prior technique, the blocked filter element is removed, manually regenerated, or regenerated in an external regenerating liquid tank, and replaced. However, this is expensive in terms of filter unit downtime, and in terms of extra labor costs for manual regenerating.

Another prior art technique is backwashing. In backwashing, the blocked filter element is switched off-line, and liquid flow through the filter element in a reverse direction dislodges the solids from the inlet side of the filter element and carries them out of the filter housing. However, backwashing may leave some of the contaminating solids on the filter element and results in downtime for the filter assembly.

More important, one backwash of one filter element may require a large quantity of liquid (e.g. 30 to 40 gallons to backwash a single 10 gallon filter housing). Backwashing may be required as frequently as every 15 minutes. Often, backwashing requires use of filtered process liquid or a special backwashing liquid which may be very expensive compared for example to water. Also, the waste stream of liquid from backwashing must be discarded in an environmentally permissible manner or treated to restore it for reuse, both of which involve additional problems, process steps and expense.

U.S. Pat. No. 5,059,331 to Goyal suggests another prior art technique in which backwashing and ultrasonic vibration of the filter unit are performed simultaneously. However, the Goyal prior art technique combines disadvantages of the above-discussed prior techniques, including the above-discussed disadvantages of backwashing.

Accordingly, the objects and purposes of the present invention include providing a filtration method and apparatus which avoid disadvantages of the above-discussed prior art techniques.

Further objects and purposes of the invention will be understood by persons familiar with apparatus of this general type by referring to the following description taken in conjunction with the accompanying drawings.

SUMMARY OF THE INVENTION

An apparatus and method for removing solids from a liquid stream has a housing including an inlet for normally receiving a solids contaminated process liquid stream, an outlet for normally outputting filtered liquid and a purge outlet for occasional filtered-out solids removal. A filter element in the housing removes contaminant solids from the process liquid and gradually becomes caked. To regenerate the filter element, the housing process liquid inlet and filtered liquid outlet are closed to shut off flow through the filter element. While such flow is off, at least one ultrasonic transducer on the housing is energizable to dislodge solids caked on the filter element. Dislodged solids accumulate in a storage zone in the housing for concentration and isolation. The stored solids are removed after many regenerations.

BRIEF DESCRIPTION OF THE DRAWINGS

FIG. 5 is a view similar to FIG. 4 showing a modification.

FIG. 6 is a view similar to FIG. 4 showing a further modification.

DETAILED DESCRIPTION

Figure 1:
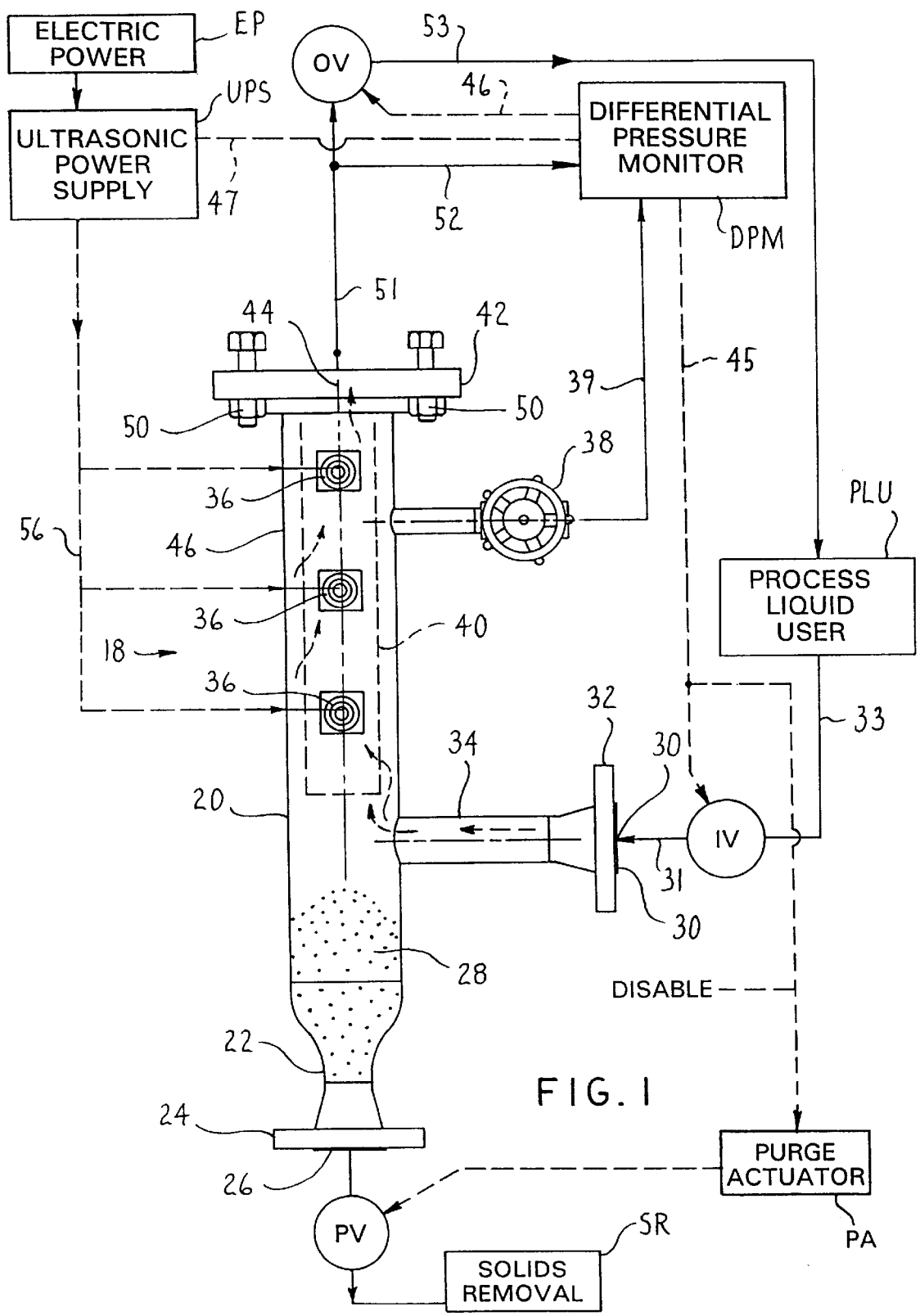
FIG. 1 is a front view of a filter unit embodying the present invention.

FIG. 1 illustrates a liquid pressure filter unit 18 embodying the invention. Filter unit 18 includes an elongated, generally cylindrically shaped filter housing 20 into which a liquid stream containing solids can be introduced for filtering.

An inlet port 30 on a middle portion of the housing 20 receives a solids contaminated process liquid stream to be filtered. The inlet port 30 is here formed by a stub inlet pipe 34 carrying a conventional inlet flange 32. Inlet flange 32 is conventionally connectable through conventional piping 31, an inlet valve IV to the outlet piping 33 of a conventional industrial process liquid user device PLU which outputs the stream to be filtered.

Figure 3:
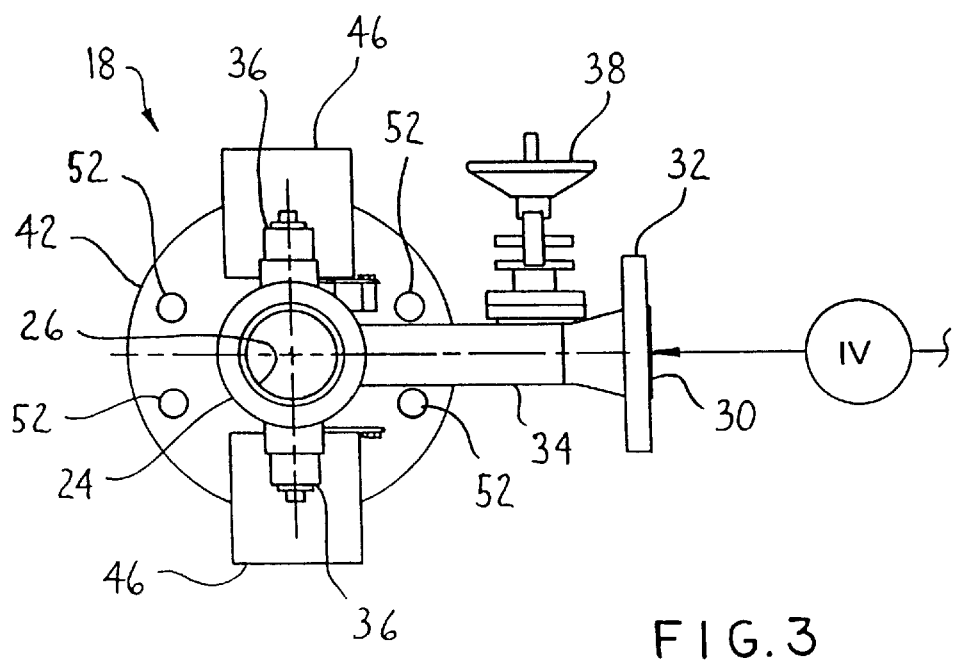
FIG. 3 is a bottom view of the FIG. 1 filter unit with the purge flange omitted to better show structure above it.

A conventional filter element, shown in broken line at 40, is contained in filter housing 20 for removing contaminating solid particles from the process liquid stream. Filter element 40 can be of any conventional porous filtration material. A filtered liquid outlet port 44 is formed, here through an outlet flange 42 on the top portion of the filter housing 20. The outlet port 44 is connectable, as by conventional nut and bolt fasteners 50 through holes 52 (FIG. 3) in the flange 42, conventional piping 51 (FIG. 1), an outlet valve OV, and further conventional piping 53 to the process liquid inlet of the process liquid user PLU. Outlet port 44 supplies filtered liquid from the filter unit 18 to the user PLU.

The filter housing 20 includes a solids storage zone or portion 22, which collects and isolates and may compact solids cake removed from the filter element as hereafter described. In the embodiment shown, the portion 22 is at the bottom of filter housing 20 below the input part, to receive solids (schematically shown at 28) which are heavier than, and so sink in, the liquid in the housing. For solids lighter than the liquid, the FIG. 1 structure may be inverted. The portion 22 is here shown necked down (though it may instead be tubular or flared) and has a purge port 26 for removal of solids from the housing 20. The purge port 26 here opens through a flange 24 fixed on the housing 20 for connecting through a purge valve PV to a conventional contaminate solids removal system SR. Purge valve PV may be periodically opened to remove collected solids 28 from filter housing 20.

Normally (i.e. during filtration) inlet and outlet valves IV and OV are open and the purge valve PV is closed.

To determine when the filter element 40 is sufficiently caked with filtered-out solids to need regeneration, it is conventional to monitor the differential pressure across the filter element 40. In the disclosed embodiment, a valve 38 (FIG. 1) communicates with the inside of the filter housing 20, here between the inlet pipe 34 and outlet flange 42. The valve 38 is normally open during filtration and applies the pressure outside the filter element 40 through a pipe 39 to one pressure input of a conventional differential pressure monitor DPM (FIG. 1). The differential pressure monitor has another pressure input connected to a branch pipe 52, the piping 51, and the outlet port 44 to the inside of the filter element 40. When the differential pressure across the filter element exceeds a set point, the differential pressure monitor DPM initiates a regenerating cycle by applying the regenerating signals on signal lines 45, 46 and 47. The regenerating signals may be of any conventional type (e.g. pneumatic), but are here shown as electrical. The inlet and outlet valves IV and OV may be manually closed in response to such regenerating signals. However, in the preferred embodiment shown, such valves IV and OV are conventional solenoid on/off valves and the regenerating signals on the lines 45 and 46 electrically energize the valve IV and OV solenoids to turn off (close) the valves IV and OV to stop filtration flow through the unit 18, while the regenerating signal on line 47 turns on a conventional ultrasonic power supply UPS to energize ultrasonic transducers 36 hereafter discussed. The ultrasonic power supply UPS receives operating power from a conventional electric power source EP (e.g. a 120 volt AC commercial wall outlet).

Figure 2:
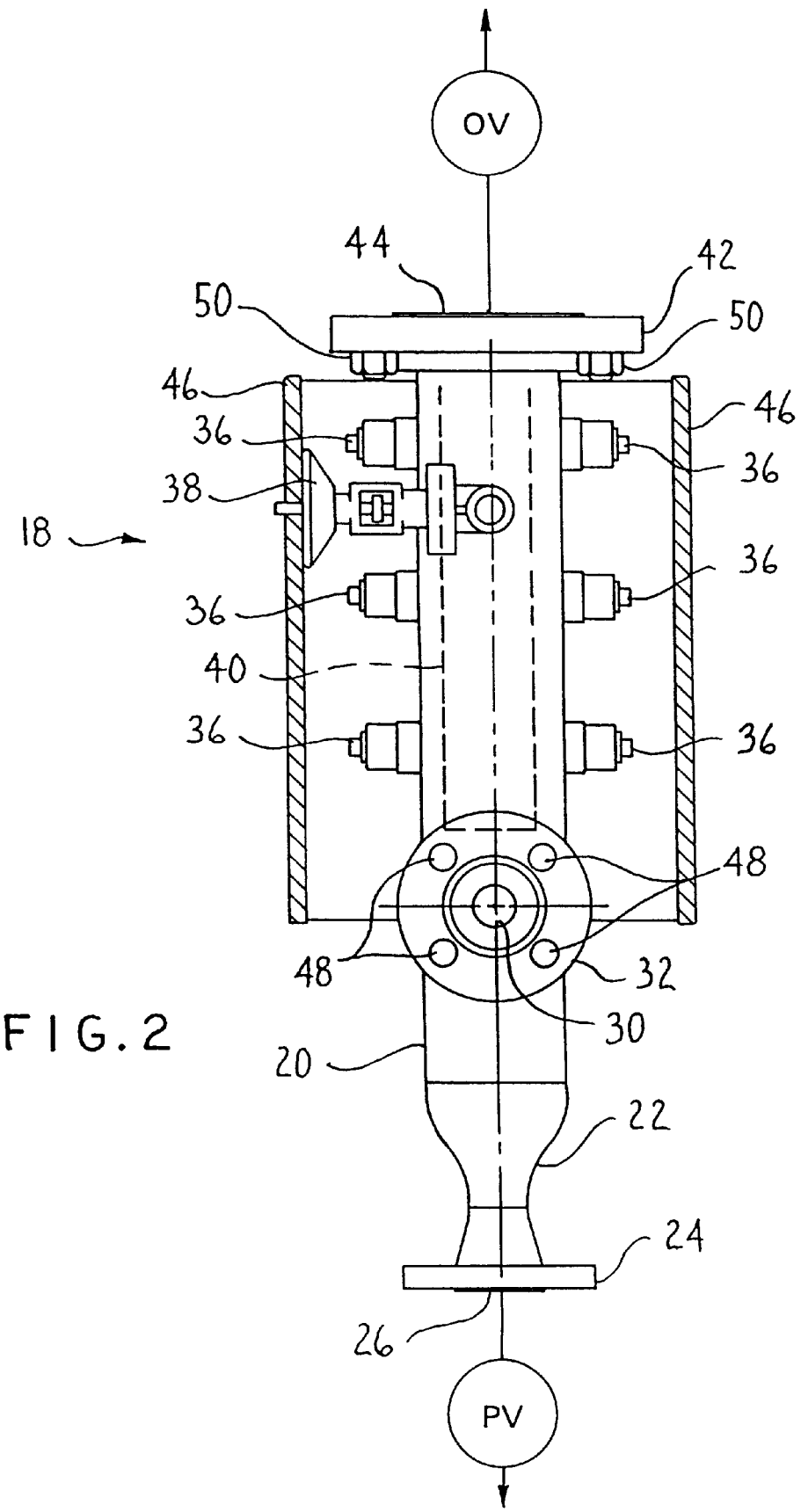
FIG. 2 is a side view of the FIG. 1 filter unit, with the transducer casing broken away in central cross-section to show the transducers.

The ultrasonic power supply UPS and ultrasonic transducers 36 are conventional and may be of a variety of types. However, in one unit embodying the invention, they were obtained from Ultrasonic Power Co. of Freeport, Ill. as ultrasonic power supply model 5300 SW and transducer item 51-01-023-3. The ultrasonic transducers 36 can be of conventional magnetostrictive type, but in the embodiment shown are piezoelectric transducers. Such transducers, when energized by ultrasonic electrical energy, produce corresponding ultrasonic frequency mechanical vibration. Conductor pairs 56 supply ultrasonic electric energy to the ultrasonic transducers 36 from the ultrasonic power supply UPS when the latter is held on by the regenerating signal on line 47. At least one transducer 36 is fixed on the housing 20. In the preferred embodiment shown, several transducers are mounted on the housing 20, preferably on opposite sides of the housing 20, as in FIGS. 1 and 2.

Figure 7:
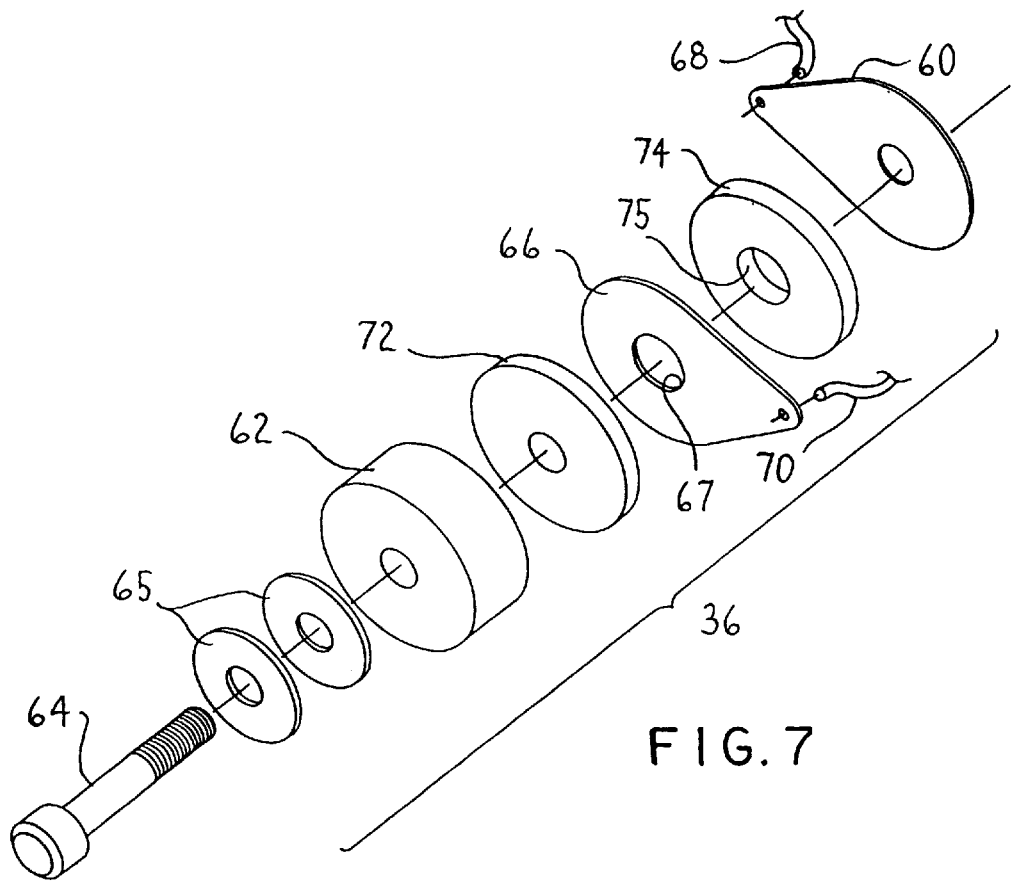
FIG. 7 is an exploded view of an ultrasonic transducer of FIGS. 1–6.
Figure 4:
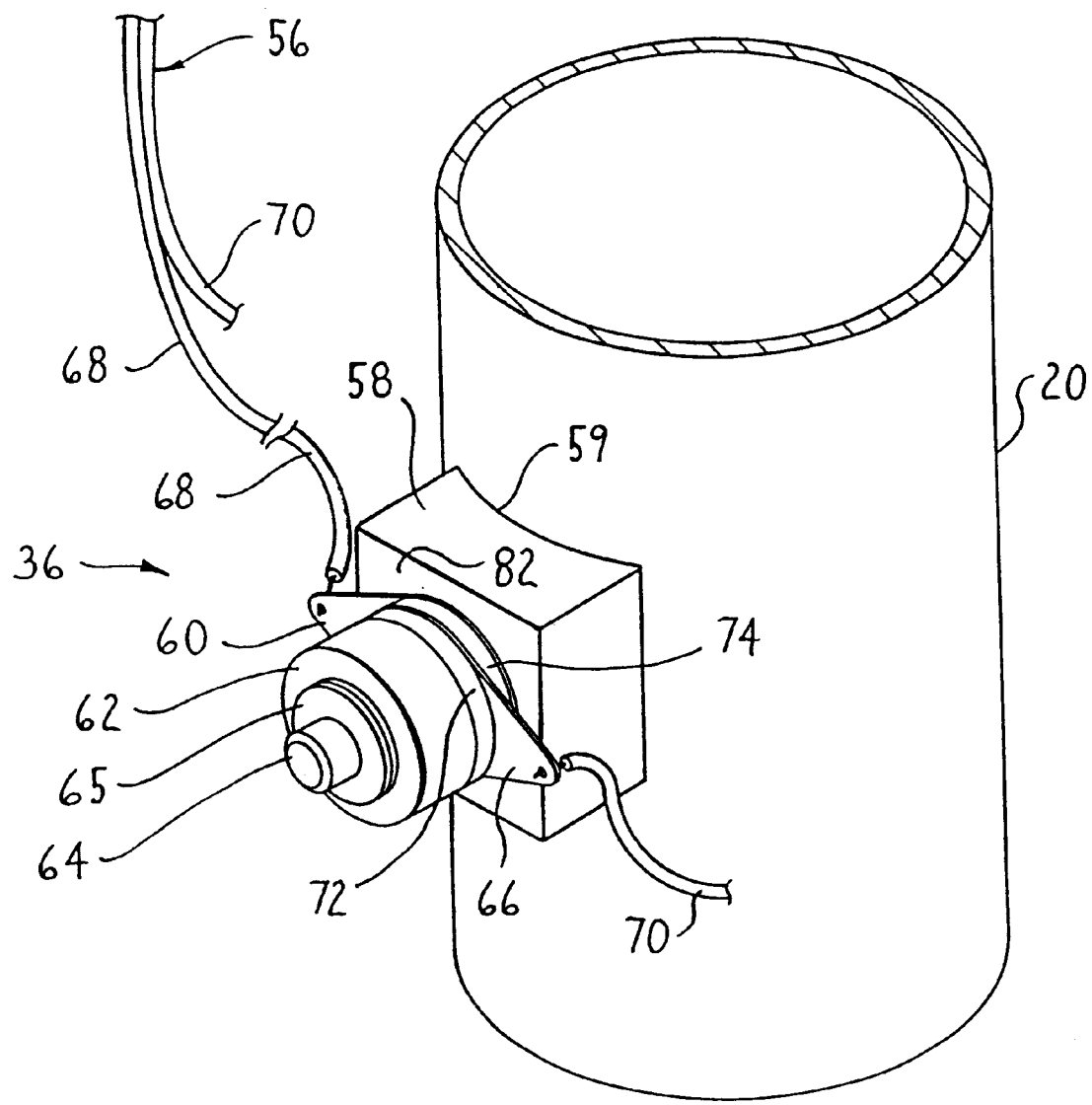
FIG. 4 is an enlarged pictorial fragment of the FIG. 1 filter housing and which details the mounting of an ultrasonic transducer to the filter housing.
Figure 8:
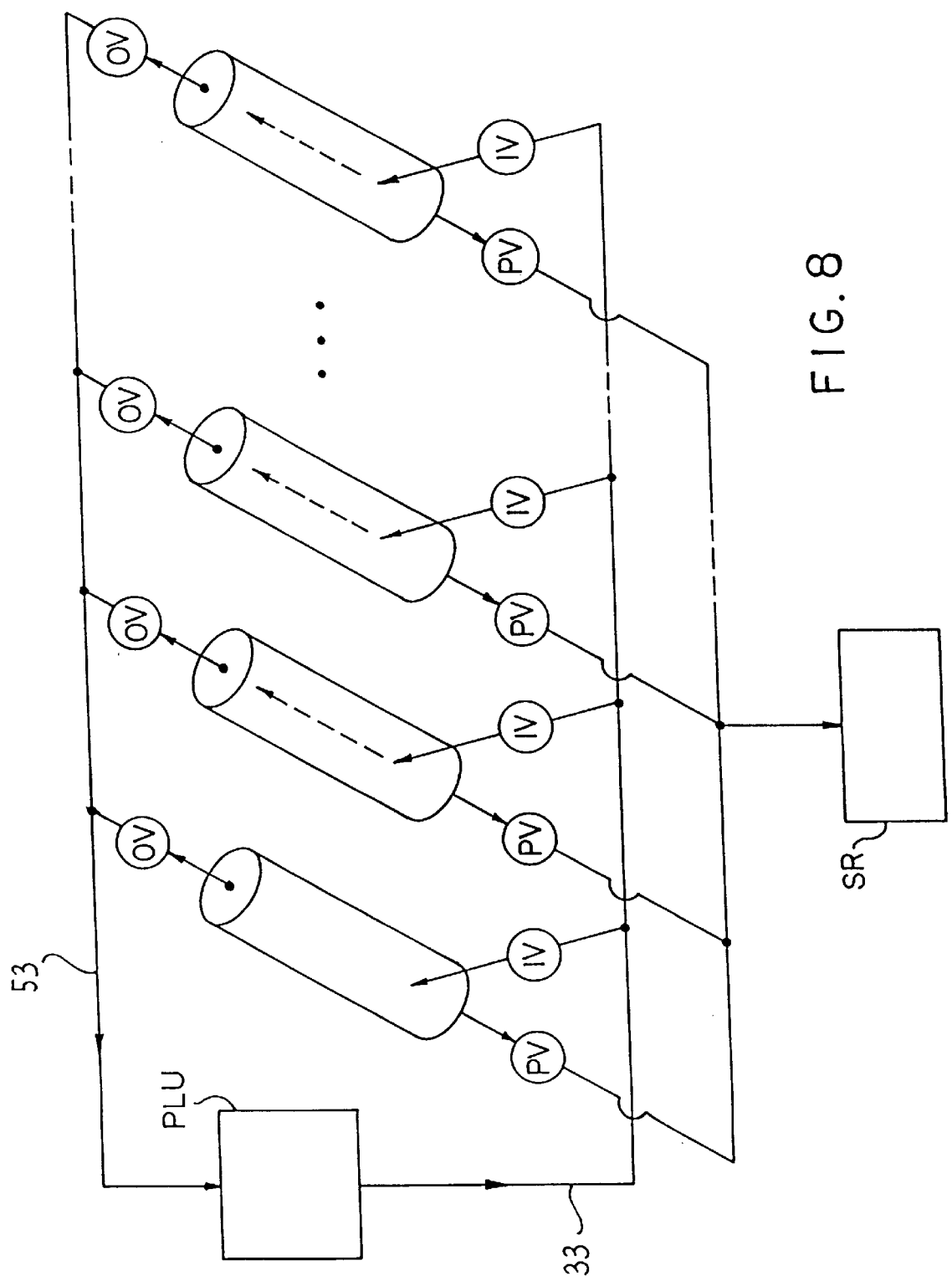
FIG. 8 is a fragmentary schematic view of a filter system made up of a plurality of filter units of FIG. 1 type, valved to a common inlet pipe and outlet pipe, to allow one filter unit to be valved off-line while other filter units continue filtration.

FIGS. 4 and 7 detail a preferred ultrasonic transducer 36 and mounting, as follows. The transducer 36 is matched to a surface mounting block 58 fixed to the outside of the filter housing 20, so as to provide intimate, substantially full surface, contact therebetween. For example, the block 58 may be welded to filter housing 20 or fixed thereto by a suitable adhesive e.g. a thin bond, hot pressed adhesive. Surface mounting block 58 is preferably of metal, for example, stainless steel or aluminum. Surface mounting block 58 has a concave cylindrical inboard surface 59 which opposes and compliments the outside surface of filter housing 20. The surface mounting block 58 has a flat outboard surface 82. The ultrasonic transducer 36 is removably fixed to surface mounting block 58. More particularly, the transducer 36 includes a screw 64 which screws into a central tapped hole in the outboard surface 82 of the surface mounting block 58 and presses against the block a stack of annular elements 60, 74, 66, 72, 62 and 65 as follows. Pressed conductively against the block surface 82 is an annular conductive terminal plate 60 connected to the ground output side of ultrasonic power supply UPS (FIG. 1) through a conductor 68 (FIG. 7). Sandwiched against plate 60 is an annular piezoelectric disk 74. Sandwiched against the piezo disk 74 is a second annular conductive terminal plate 66 connected to the other output side of the ultrasonic power supply UPS (FIG. 1) through a conductor 70 (FIG. 7). Conductors 68 and 70 are insulated from each other and together define the FIG. 1 conductor pair 56. The center holes 75 and 67 of the piezo disk 74 and outboard terminal plate 66 are larger than the screw 64 and thus prevent electrical contact of the screw 64 with the piezo disk 74 and terminal plate 66. Sandwiched against the terminal plate 66 is an annular ceramic insulator 72. Sandwiched against the insulator 72 is a massive annular back slug 62 backed by washers 65. The screw 64 is tightened to press the washers 65, back slug 62, ceramic insulator 72, plate 66, piezo disk 74 and plate 60 firmly against the surface mounting block 58. The ultrasonic vibrations from the transducer 36 are thus conducted through the surface mounting block 58 to the filter housing 20 and thence to the contents of the latter. The surface mounting block 58 is a versatile mount in that the ultrasonic transducers can readily be mounted anywhere on the surface of filter housing 20.

A transducer casing 46 encloses and protects the ultrasonic transducers 36 on each side of the housing 20 from damage and/or weather exposure. Since the ultrasonic transducers 36 typically are operated by approximately 2,000 volt high frequency electric power, the casing also protects against accidental electrical shocks to bystanders and sparking. Additionally, the transducer housing 46 can be positively pressurized to prevent ambient volatile gases from entering the casing. This is particularly useful in refinery applications or other hazardous locations.

OPERATION

The filter unit 18 (FIG. 1) embodying this invention is used, in the same manner in which conventional filter units are used, to filter a process liquid stream. A process liquid stream, containing contaminating solids to be filtered-out, is introduced into the inlet port 30 through inlet valve IV and flows through inlet pipe 34 into the filter housing 20 where it flows around filter element 40. The process liquid then passes inward through filter element 40, which removes undesired solids. Filtered liquid exits the filter housing 20 from outlet port 44. After a time of filtration, the filter element 40 will tend to become caked with removed solids, such time being determined by factors including the contaminating solids content of the process liquid stream being filtered.

Rejuvenation of the filter element 40 is controlled (manually, or by the monitor DPM) as follows. The inlet valve IV is closed to stop the flow of unfiltered liquid into the filter housing 20, and the outlet valve OV is closed. This isolates the filter unit 18 from the incoming and outgoing liquid streams and equalizes the pressure across the filter element. The ultrasonic power supply UPS is briefly turned on to energize the transducers 36. The ultrasonic transducers 36 preferably operate in the frequency range from 20 Khz to 50 Khz. The transducers 36 transmit ultrasonic vibration through the wall of the filter housing 20 to ultrasonically vibrate and/or cavitate the liquid surrounding the filter element 40 and thus dislodge solids caked on the outside (input side) of the filter element 40. The supply UPS and transducers 36 are then turned off.

The dislodged solids then gravitate through the nonflowing liquid in the housing 20 and collect in the solids storage zone 22. In the FIG. 1 embodiment, the solids storage zone 22 is adjacent the bottom of the filter housing 20 for collecting dislodged solids heavier than the process liquid to be filtered and which sink by gravity therethrough. Alternately, with the FIG. 1 housing 20 inverted, dislodged solids lighter than the surrounding process liquid to be filtered will due to their buoyancy, float upward into the solids storage zone 22 at the top of the inverted FIG. 1 housing 20. Thus, by "gravitate" we mean to include either such sinking or floating.

The operation time of the ultrasonic transducers 36 can be varied from several seconds to several minutes, depending upon the time needed to dislodge the filter cake from the filter element, e.g. upon the amount of blocking of the filter element 40 and the character of the solids being removed.

The subsequent solids collection and storage can also be varied, e.g. depending on the float/sink rate of the dislodged solids and the length of housing 20. A relatively shorter transducer operating time has been followed by a relatively longer solids collection and storing time, in most instances.

One use of the inventive method operated the ultrasonic transducers 36 for about ten seconds, then collected the dislodged solids for about one minute.

Thereafter the valves IV and OV are opened to restore filtration flow through the filter unit 18.

After a large number of (e.g. 200 to 1000) cycles of filtration and ultrasonic filter element regeneration, a sufficient amount 28 of dislodged solids collect in the storage zone 22 of the filter housing 20 to about fill same and so require removal. Then, with the valves IV and OV open and the filter unit still on line, the purge valve PV is very briefly opened (e.g. for a second or so) whereupon the normal liquid pressure inside the filter unit 18 during filtration pushes the collected solids 28 out of the purge port 26 and into the solids removal system SR. In testing to date, typically about a gallon of the process liquid, in a 10 gallon housing, may be used to push the collected solids 28 out of the purge port.

It can be seen that the present invention has substantial advantages over prior art methods.

For example, this invention eliminates the prior art need for backwashing and the need to dispose of used backwashed liquid. Particularly important is the great reduction in backwashing contamination or loss of valuable liquid. Use, under the present invention, of about one gallon of process liquid to purge storage solids once a week in a filter unit that would otherwise need one 30 gallon backwash every 15 minutes would mean about 20,000 times the liquid contamination/waste in a conventional backwash filter unit compared to a filter unit embodying the present invention.

Also, under the present invention, fewer and larger filter units 18 per system can be used to filter a given volume of process liquid. More particularly, increasing the filter housing volume, to allow increasing the number of filter elements in a single housing, desirably increase the filtering element surface area (and hence filtration capacity and process liquid flow rate) for a given volume of factory/refinery/etc. space filled by the filtration system. However, doubling or quadrupling the housing volume in a backwashing system correspondingly doubles or quadruples the required backwash liquid flow rate. Thus, a significant increase in housing size can raise difficult problems in a backwash type filter system in requiring e.g. correspondingly larger backwash liquid supply and pump size, increased liquid losses per backwash, greater dead poorly or non backwashable area in the filter housing, etc. However, in the inventive system, we find that an increased housing volume is easily compensated merely by a corresponding increase in ultrasonic energy input.

This invention thus can save cost in both maintenance, operating cost and initial capital investment.

The present invention has been found particularly effective where the filtered-out solids are more in the nature of hard solid particles such as rust scale, catalyst fines, and other hard nodular contaminants which form a cake on the filter element during filtering, wherein the ultrasonic energy breaks up the cake and knocks it off the inlet face of the filter element.

In testing a filter unit embodying the invention, raising the internal liquid pressure as high as 150 pounds per square inch (150 psi) did not degrade the regeneration of the caked filter element, so that filter units embodying the invention can be operated at a wide range of liquid pressures (e.g. from atmospheric up to at least 150 psi).

MODIFICATIONS

FIG. 5 shows a modified transducer mount similar to that of FIGS. 1–4 and 7 except as follows. In FIG. 5, a modified mounting block 80 fixes the ultrasonic transducer 36 on filter housing 20. The modified mounting block 80 is of circular cross section and fits snugly to a hole in the filter housing 20. The outside peripheral surface of the mounting block 80 is fixed to the filter housing 20, preferably by welding. To this end, the block 80 is preferably of the same material as the filter housing 20, e.g. of stainless steel. An adhesive attachment technique could also be used. Through hole mounting block 80 has an inboard end (not shown) which is contoured so as to be flush with the inner periphery of the housing 20.

FIG. 6 shows a further modified transducer mount similar to that of FIGS. 1–4 and 7, except as follows. In FIG. 6 a ring structure 76 has one or more integral, radially outwardly extending bosses 78. Each boss 78 serves as a mounting block for mounting one of the ultrasonic transducers 36, in the same manner as blocks 58 and 80 above discussed. Several such ring structures 76, coaxially stacked upon one another and welded together form the central portion of a filter housing like the housing 20 above discussed.

It will be intuitively obvious to one skilled in the art that various changes and modifications can be made to the present invention without departing from the spirit or scope of the invention. Therefore it is manifestly intended that the invention be limited only by the claims and equivalents thereof.

The embodiments of the invention in which an exclusive property or privilege is claimed are defined as follows:

1. A method of regenerating a filter element blocked with solids filtered from a pressurized process liquid stream, without backwashing the filter element or removing it from its housing, such method comprising the steps of:

(a) terminating filtering by (i) closing an inlet valve and thereby preventing a solids contaminated liquid stream from entering said filter housing, and (ii) closing an outlet valve and thereby preventing a filtered liquid stream from leaving said filter housing;

(b) energizing an ultrasonic transducer fixed on said housing for a period of time and thereby dislodging solids from a filter element in said housing;

(c) accumulating dislodged solids in a solids storage portion of said housing;

(d) resuming filtration by opening said inlet and outlet valves and thereby flowing the process liquid stream through the regenerated filter element.

2. The method of claim 1, comprising the additional steps of:

(a) monitoring differential pressure across said filter element;

(b) closing said inlet and outlet valves and energizing said ultrasonic transducer when said differential pressure rises to a high limit and indicates said filter element is solids caked enough to require regenerating.

3. The method of claim 1 including, after a number of filter element regenerations, (a) during filtration, momentarily opening a purge valve connected to said housing solids storage portion through a purge port;

(b) pushing said collected solids from said purge port with the help of solids contaminated, pressurized liquid in said housing, while limiting the volume of liquid exiting said purge port to a small fraction of the volume of said housing;

(c) closing said purge valve.

4. A filter apparatus for removing solids from a process liquid stream and regenerating a filter element without disassembly or substantial off-line time, comprising:

a housing;

a filter element in said housing for removing solids from a liquid stream;

a normally open inlet valve open to said housing and closeable for stopping a contaminated process liquid stream from entering said housing;

a normally open outlet valve open to said housing and closeable for stopping a filtered liquid stream from exiting said housing;

at least one ultrasonic transducer fixed on said housing and actuable to dislodge solids caked on said filter element and collect same in said solids collection port of said housing for periodic removal;

a differential pressure monitor means connected to the interior of said housing on opposite sides of said filter element and responsive to buildup to a relatively higher pressure drop across said filter element for:

(1) closing said normally open inlet and outlet valves and stopping flow through said filter element and housing, and (2) energizing said ultrasonic transducer, while flow through said housing is stopped, to dislodge caked solids from said filter element, said monitor means being responsive to a reduction in said pressure drop to a relatively lower pressure drop for:

(1) deenergizing said ultrasonic transducer, and (2) opening said inlet and outlet valves to restore filtration flow through said filter element and housing.

5. The apparatus of claim 4, including a dislodged solids storage zone in said housing in communication with an inlet side of said filter element and sized to store solids dislodged by a series of transducer energizations, a normally closed purge valve open to a dislodged solids storage zone in said housing offset from said filter element and openable for occasionally removing stored solids from said storage zone, said inlet and purge valves facing said inlet side of said filter element and said outlet valve facing an outlet side of said filter element;

means on said purge valve for opening same and purging said housing radially of said filter housing of collected solids after a plurality said energizings of said ultrasonic transducer.

6. A filter apparatus for removing solids from a process liquid stream and regenerating a filter element without disassembly or substantial off-line time, the apparatus comprising:

a housing having an inlet port for receiving a solids contaminated process liquid stream and an outlet port operable for outputting a filtered liquid stream;

a filter element in the housing separating said inlet and outlet ports for removing contaminating solids from a process liquid stream;

at least one ultrasonic transducer fixed on said housing and periodically energizable to vibrate the contents of said housing and thereby dislodge solids caked on said filter element;

a dislodged solids collection and storage zone in said housing, said zone being open to said inlet port and an inlet side of said filter element;

a purge port adjacent said zone for occasionally venting solids stored in said zone;

an inlet valve connected to said inlet port and closeable for stopping a contaminated liquid stream from entering said inlet port;

an outlet valve connected to said outlet port and closeable for stopping a filtered liquid stream from exiting said outlet port;

a purge valve connected to said purge port and openable for removing solids from said holding zone through said purge port;

monitor means responsive to periodic buildup of solids cake on said filter element for causing at least said inlet valve to be closed and said ultrasonic transducer to be energized for a selected regeneration interval, to dislodge solids caked on said filter element and add dislodged solids to said solids collection zone adjacent said purge port;

means operable, only after completing several such periodically occurring regeneration intervals, and with at least said inlet valve open, for opening said purge valve and pushing stored solids out of said housing through said purge port.

7. The apparatus of claim 6, including a differential pressure monitor operatively connected across said filter element and to said ultrasonic transducer and responsive to a selected differential pressure to actuate said ultrasonic transducer.

8. The apparatus of claim 6, including a surface mounting block fixed on the peripheral surface of said filter housing, said surface mounting block having a concave surface which faces and compliments the shape of said housing, said mounting block having an outboard surface, said ultrasonic transducer being removably fixed to said outboard surface whereby ultrasonic vibrations are transmitted from said ultrasonic transducer through said surface mounting block to said filter housing.

9. The apparatus of claim 8, in which said block is fixed to said housing by welding.

10. The apparatus of claim 8, in which said block is fixed to said housing by an adhesive bond.

11. The apparatus of claim 10, in which said adhesive bond is a thin bond, hot pressed adhesive.

12. The apparatus of claim 6, in which said housing has a peripheral wall, a ring structure forming an intermediate length part of said housing peripheral wall, said ring structure having at least one boss extending radially outward from said housing peripheral wall, said boss having an outboard surface, said ultrasonic transducer being removably fixed to said outboard surface whereby ultrasonic vibrations are transmitted from said ultrasonic transducer through said boss to said filter housing.

13. A filter apparatus for removing solids from a process liquid stream and generating a filter element without disassembly or substantial off-line time, the apparatus comprising:

a housing having an inlet port for receiving a solids contaminated process liquid stream and an outlet port operable for outputting a filter liquid stream, said housing having a peripheral wall having a substantially circular inner periphery;

a filter element in the housing and separating said inlet and outlet ports for removing contaminating solids from a process liquid stream;

at least one ultrasonic transducer periodically energizable to vibrate the contents of said housing and thereby dislodge solids cake on said filter element;

a dislodge solids collection and storage zone in said housing, said zone being open to said inlet port and inlet side of said filter element;

a purge port adjacent said zone for occasionally venting solids stored inside zone;

a through hole block extending into and closing a hole of said filter housing peripheral wall, said through hole block having a peripheral surface fixed directly to said housing peripheral wall and sealing against the portion of said housing peripheral wall surrounding said hole, said through hole block having an inboard end in said housing and an outboard end, said through hole block inboard and being substantially flush with the inner periphery of said housing, said ultrasonic transducer being separated from the interior of said filter housing by said through hole block and fixed to said through hole block outboard end whereby ultrasonic ultrasonic vibrations are transmitted from said ultrasonic transducer through said through hole block to the interior of said filter housing radially of said filter housing, said through hole block fixing said ultrasonic transducer to said housing.

14. The apparatus of claim 13, in which said ultrasonic transducer comprises a first annular conductive terminal plate conductively adjacent said through hole block, said plate being connectable to an ultrasonic power supply;

an annular piezoelectric disk conductively adjacent said plate;

a second annular conductive terminal plate conductively adjacent said piezoelectric disk, said second plate being connectable to an ultrasonic power supply;

an annular ceramic insulator adjacent said second plate;

an annular back slug adjacent said insulator;

a screw threaded in the outboard end of said through hole block and therefrom axially extending through said annular first plate, disk, second plate, insulator and slug and having a head tightly abutting said slug.

15. The apparatus of claim 13 in which said block inboard end is contoured.

* * * * *

UNITED STATES PATENT AND TRADEMARK OFFICE
CERTIFICATE OF CORRECTION

PATENT NO.    : 6,251,294 B1
DATED         : June 26, 2001
INVENTOR(S)   : Scott Judson Davis et al.

It is certified that error appears in the above-identified patent and that said Letters Patent is hereby corrected as shown below:

Column 8,
Line 23, delete -- radially of said filter housing --.
Line 24, after "solids" insert -- only --.

Column 9,
Line 7, replace "the" with -- a --.
Line 45, replace "cake" with -- caked --.

Column 10,
Line 1, replace "dislodge" with -- dislodged --.
Line 3, before "inlet" insert -- an --.
Line 6, replace "inside" with -- in said --.
Line 14, replace "and" with -- end --.

Signed and Sealed this

Ninth Day of April, 2002

Attest:

JAMES E. ROGAN
Attesting Officer    Director of the United States Patent and Trademark Office